United States Patent [19]
Brown

[11] Patent Number: 6,103,183
[45] Date of Patent: Aug. 15, 2000

[54] SUPPORTING GUIDE FOR OXYACETYLENE TORCH

[76] Inventor: Richard I. Brown, 723 Oak St., Sandpoint, Id. 83864

[21] Appl. No.: 09/350,895

[22] Filed: Jul. 12, 1999

[51] Int. Cl.$^7$ .................................................. B23K 7/10
[52] U.S. Cl. .................................. 266/66; 266/48; 266/77
[58] Field of Search ................................ 266/48, 58, 66, 266/68, 76, 77

[56] References Cited

U.S. PATENT DOCUMENTS

| 1,704,473 | 3/1929 | Greene | 266/77 |
| 2,281,814 | 5/1942 | Willoughby | 266/66 |
| 2,341,751 | 2/1944 | Willoughby | 266/77 |
| 3,139,471 | 6/1964 | Root | 266/48 |
| 4,411,411 | 10/1983 | Barthelmess | 266/66 |
| 4,549,725 | 10/1985 | Carroll | 266/58 |
| 4,688,770 | 8/1987 | Keedy | 266/66 |

*Primary Examiner*—Scott Kastler
*Attorney, Agent, or Firm*—Keith S. Bergman

[57] ABSTRACT

A supporting guide for an oxyacetylene torch provides a body having spaced legs defining a recess therebetween to carry gas supply pipes of the torch for releasable attachment of the supporting guide to the supply pipes. A body portion distal from the recess pivotally carries a disk carrying a support arm extending spacedly therefrom for pivotal motion relative to the body to support the torch and guide it on a workpiece or a template. The support arm is carried by the disk for adjustable extension and angulation relative to the body to regulate the distance of a torch nozzle from a workpiece and the angulation of the torch nozzle relative to the workpiece.

4 Claims, 2 Drawing Sheets

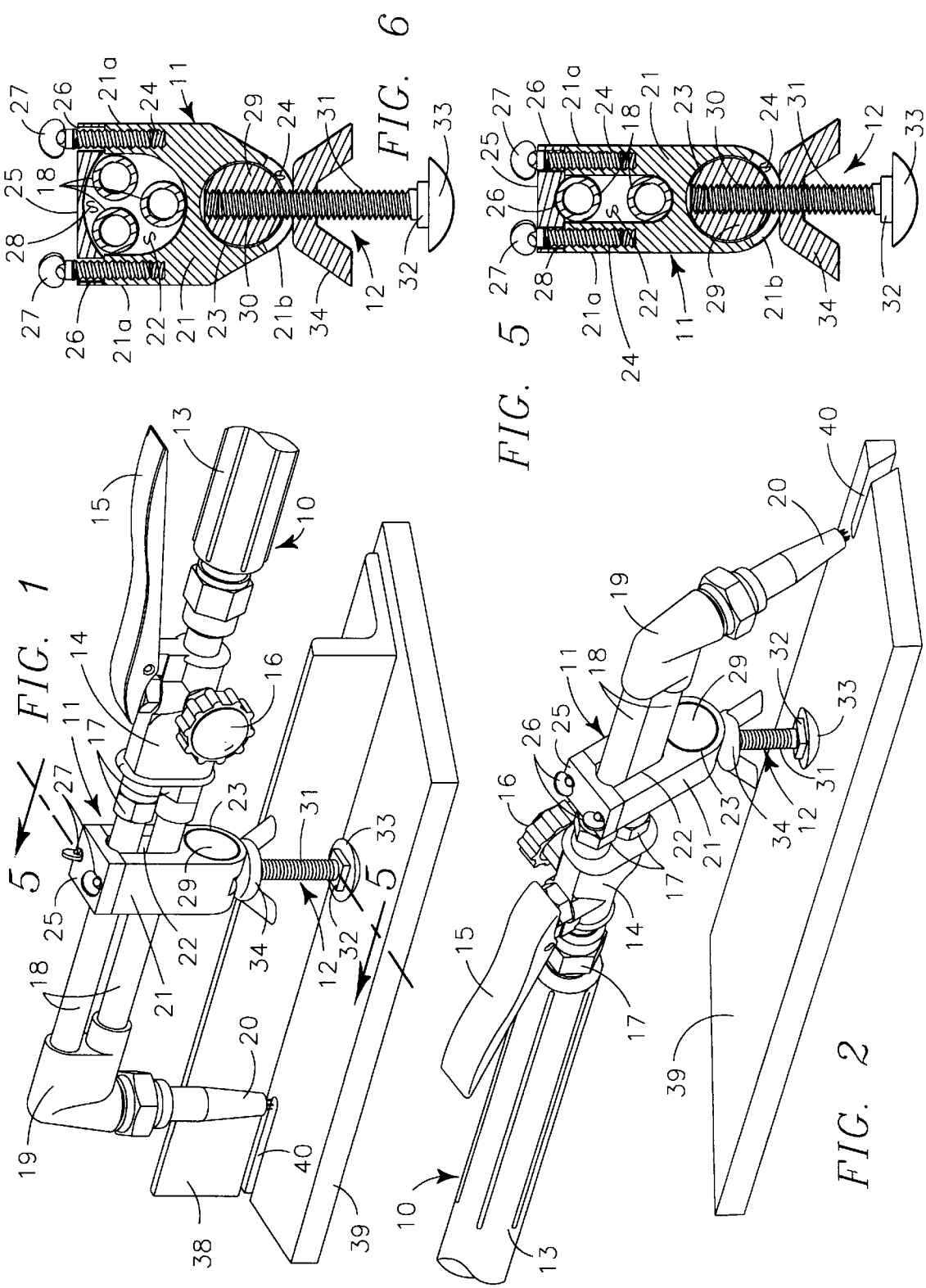

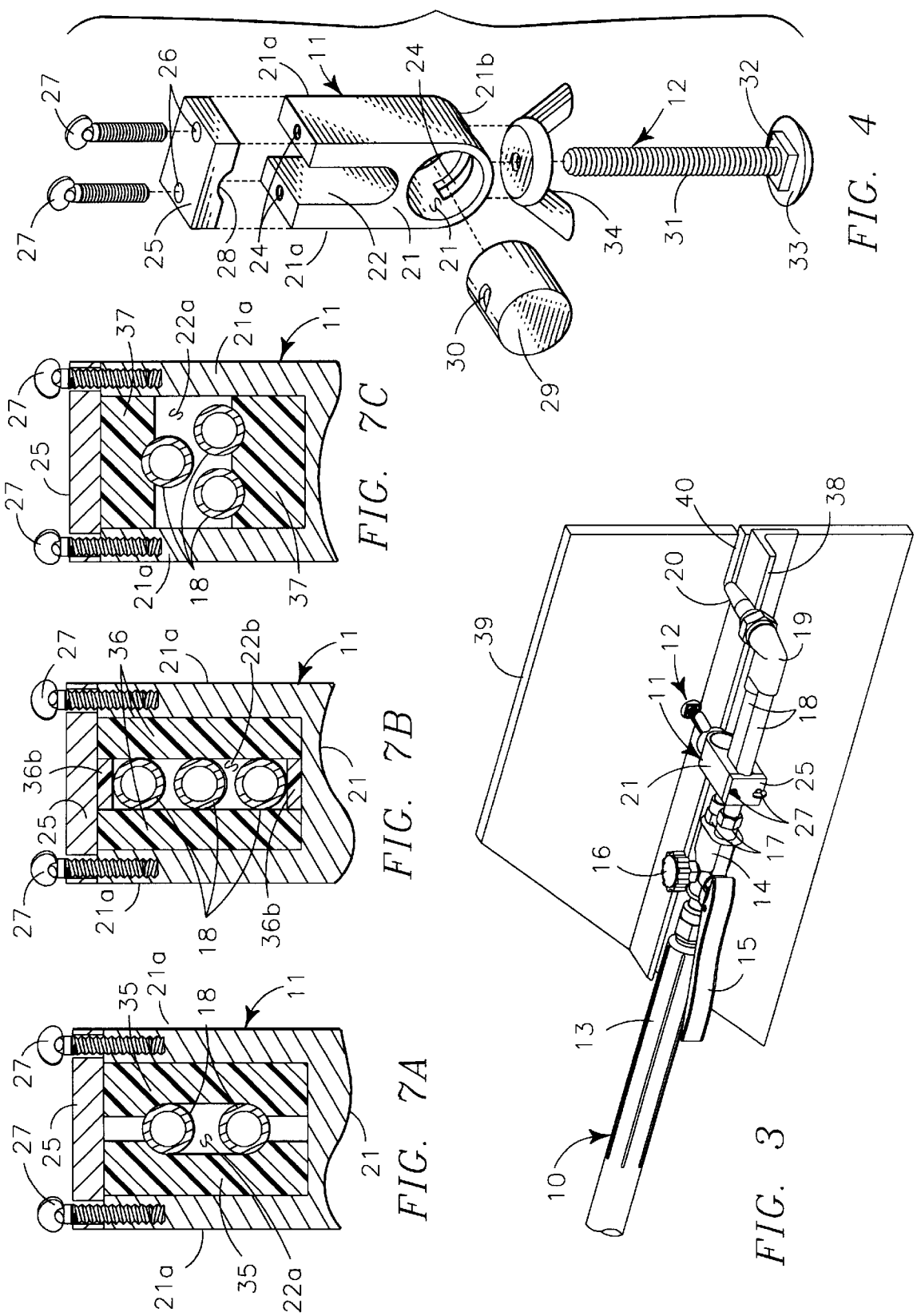

SUPPORTING GUIDE FOR OXYACETYLENE TORCH

BACKGROUND OF INVENTION

1. Related Applicatioon

There are no applications related hereto heretofore filed in this or any foreign country.

2. Field of Invention

This invention relates generally to a supporting guide for oxyacetylene torches, and more particularly to such a guide that regulates the distance and angulation of a torch nozzle relative to a workpiece.

BACKGROUND AND DESCRIPTION OF PRIOR ART

Oxyacetylene torches have long been known and used for joining and severing various metallic materials, and especially ferrous metals. The history of such devices is long and during that historicity substantial knowledge has been developed concerning both torches and oxyacetylene welding and cutting of metals. Responsively apparatus and processes for their use have become increasingly sophisticated and complex, but problems still remain. The instant supporting guide provides an ancillary device for use on a torch to resolve some of those remaining problems.

The control of cutting and welding torches both as to course of travel and position relative to a workpiece have presented problems throughout the history of the thermal joinder and shaping of metals and especially with oxyacetylene cutting of ferrous metals. Aside from maintaining configurational integrity, the positioning of a torch and its motion can and commonly do affect essentials of the cutting and joining processes, sometimes to change them even to the point of inoperativeness. These problems have been recognized and responsively various ancillary devices for supporting or guiding torches, or both, have become known, but such devices have not resolved problems which the instant supporting guide resolves or alleviates.

For ease of consideration, supporting guide devices may be divided into two essentially different classes, with a first class providing mechanical systems that require no manual manipulation of the torch at all for its support or during its course of motion and a second class providing devices that aid guidance and support of a torch, but require direct manual manipulation by an operator to accomplish their motion. The instant invention is of the second class of devices and a member of a subclass that provides both guidance and support functions, as opposed to other subclasses providing only one or the other of those functions.

Supporting guides for torches to have maximum utility must be releasably carried by a torch to allow use of a single supporting guide on different torches and must be usable on a substantial number of torches of differing design. Such supporting guides must also be usable on torches without requiring change or modification of the existing torch structures and must be retrofittable on a variety of existing torches of different design and manufacture. To accomplish this end, the instant supporting guide provides a body defining a cavity that is closable by a releasably maintained element to define a channel to allow positioning of torch gas feed pipes therein for fastenable interconnection of the supporting guide thereon.

Almost all torches of present commerce and use provide exposed gas supply pipes extending between a valving structure and burner tip whereon the instant guide may be carried. Most modern torch designs provide either two vertically related or three vertically or triangularly related gas supply pipes to allow use of the instant guide, with an appropriately configured orifice, on any of these torch designs. If it is desired to use a single guide for all three types of torches, the body channel may be configured to accept the largest cross-sectional dimensions of any pipe configuration and provided with fillers to fasten about pipe configurations that are smaller, to contain and releasably fasten all of the configurations. This universality of application of the instant supporting guide provides distinguishment from prior devices of the second class that were configured for use on only one particular torch.

To position a torch nozzle relative to a workpiece, a support arm is carried by the supporting guide body to extend therefrom and contact the workpiece, or a support immovably associated therewith, to support the torch during a course of motion. The instant support arm is adjustably carried by the body for predeterminable extension to adjustably regulate the distance between a torch nozzle and workpiece to maintain appropriate cutting and welding parameters. The support arm also is movably carried by the supporting guide body for pivotal motion in the plane perpendicular to the gas supply pipes to allow the support arm to extend in angulated orientation to the nozzle of the torch to aid the making of angulated cuts in a workpiece when the guide is supported either by a template or on the workpiece.

The support arm also serves as a follower to direct torch motion along a course similar to a template configuration to allow the making of clean and regular cuts in metal with substantial configurational accuracy such as is made by a completely mechanically guided system of the first class. The support arm provides a particular configuration that allows its use with many types of templates heretofore used for such purpose.

My invention resides not in any one of these features individually, but rather in the synergistic combination of all of its structures which necessarily give rise to the functions flowing therefrom as herein set forth and claimed.

SUMMARY OF INVENTION

My supporting guide for oxyacetylene torches provides a vertically elongate body defining an upper medial cavity to receive gas supply pipes of the torch, with a releasably fastenable top enclosing an upper portion of the cavity to form a channel and to fasten gas supply pipes of the torch therein. A portion of the body depending beneath the gas supply pipes defines a cylindrical orifice to movably carry a support arm disk for pivotal motion in a plane perpendicular to the gas supply pipes. An elongate arcuate channel extends through the lower portion of the body from the cylindrical orifice to allow passage and motion of a support arm therein. An elongate support arm having a threaded body portion depends from threaded engagement with the support arm disk, through the body slot and spacedly therebelow. The upper medial portion of the support arm threadedly carries a wing nut adjacent the lower surface of the body to fasten against the body to releasably maintain the support arm in a predetermined angular position and at an adjustable distance from the body. The outer end portion of the support arm defines head structure to serve as a support and a template follower.

In creating such a device, it is:

A principal object to provide a supporting guide having a body that fits about the gas supply pipes of an oxyacetylene torch to depend therefrom to support the torch nozzle at an adjustably determinable distance from and in adjustably determinable orientation angular relative to a workpiece and to serve as a template follower to guide the manual motion of the torch along a template surface.

A further object is to provide such a supporting guide that defines an upper medial channel to fastenably receive gas supply pipes of commercially available torches having two vertically spaced pipes or three pipes spaced in vertical or triangular array.

It is a further object to provide a guide with such an upper medial channel that may carry fillers to allow a single channel to be used with various gas supply pipe arrays, while maintaining secure releasable interconnection of the guide on the pipes.

A still further object is to provide such a guide that has a movably carried support arm to allow variable extension from and angulation relative to the body to adjustably regulate the distance between a torch nozzle and workpiece and aid the making of angulated cuts in a workpiece.

A still further object is to provide such a guide that has a support arm with a depending end structure that allows it to supportively move on a workpiece or on a support immovably associated with the workpiece and also to serve as a template follower to aid in making accurate clean cuts of substantial configurational accuracy.

A still further object is to provide such a device that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention, however, it is to be understood that its features are susceptible of change in design and structural arrangement with only a preferred and practical embodiment of the best known mode being illustrated in the drawings and described in the accompanying specification and claims, as is required.

BRIEF DESCRIPTION OF DRAWINGS

In the accompanying drawings which form a part hereof and wherein like numbers of reference refer to similar parts throughout:

FIG. 1 is a forward looking isometric view of my supporting guide in operative position on a generic welding torch positioned to make a vertical cut.

FIG. 2 is a rearward looking view of the torch of FIG. 1 with the supporting guide positioned to make an angulated cut in a workpiece.

FIG. 3 is an isometric view of the torch of FIG. 1 with the supporting guide supported on a template to make a horizontal cut in a vertically orientated workpiece.

FIG. 4 is an expanded isometric view of my supporting guide showing its various parts, their configuration and relationship.

FIG. 5 is a vertical cross-sectional view through the torch and support of FIG. 1, taken on the line 5—5 thereon in the direction indicated by the arrows.

FIG. 6 is a cross-sectional view taken on a line such as 5—5 of FIG. 1 in the direction indicated by the arrows, but showing a torch with three angularly arrayed gas supply pipes and a supporting guide configured to fit thereon.

FIGS. 7A, 7B and 7C show partial cross-sectional views, taken on a line such as 5—5 on FIG. 1 in the direction indicated by the arrows, to show use of the guide with fillers for torches having various common supply pipe configurations.

DESCRIPTION OF PREFERRED EMBODIMENT

My invention generally provides a supporting guide, for a welding torch 10, that has body 11 movably carrying support arm 12 extending spacedly therefrom.

Modern oxyacetylene torches for welding and cutting metals, though of varying configurational detail, all have the same essential elements and quite similar essential configuration. A common generic form of welding torch 10 is illustrated in FIGS. 1–3 where it is seen to provide rearward handle 13 having means for attachment of flexible hoses of compressed gas supplies (not shown) and structurally carrying valving structure 14 having gas flow control handle 15 and regulator knob 16. The valving structure 14 carries forwardly extending fixtures 17 interconnecting forwardly extending gas supply pipes 18. The forward portions of the gas supply pipes 18 carry burner tip elbow 19 which releasably carries burner tip 20 extending therefrom perpendicularly to the gas supply pipes. This essential structure is common in substantially all oxyacetylene welding and cutting torches of present day commerce and use, though torches of various manufactures and those for particular uses differ in accidental features of both structure and configuration. It is with this type of welding torch that my supporting guide is operative.

Substantially all modern oxyacetylene torches have two or more separated gas supply pipes extending a spaced distance between the valving structure 14 and burner tip elbow 19, but the number of pipes and their array vary in torches of different manufacture and for different purposes. The gas supply pipes are generally of substantially the same diametrical size and the substantial majority of torches have two or three such pipes. Arrays of both two and three arrays of such pipes are commonly arranged in vertical alignment, though a minority of torches having three pipes provide a triangular array, generally with two pipes in horizontal alignment and the third pipe above or below the mid point between the two horizontal pipes. The instant supporting guide is usable with any of these pipe arrays and also with other arrays when appropriately configured.

As seen especially in FIGS. 4–6, supporting guide body 11 provides U-shaped body element 21 having upwardly extending parallel legs 21a with coplanar upper surface to define recess 22 therebetween and lowermost curved portion 21b defining cylindrical channel 23 extending therethrough parallel to gas supply pipes 18 to hold a support arm disk. Arcuate support arm slot 24 is defined to extend perpendicularly to the axis of channel 23 to communicate between the cylindrical channel 23 and the exterior surface of lower curved body portion 21b to receive a depending support arm and allow motion of the support arm in the channel. Preferably channel 24 extends through an arc of approximately 180 degrees, but at least 90 degrees. The upper surfaces of the longitudinally medial portions of each leg 21a define downwardly extending threaded holes 24 to receive threaded fasteners to maintain a top element on the legs to enclose the upper portion of recess 22 to form a peripherally enclosed channel or orifice as illustrated.

Top element 25 in the instance illustrated is of rectilinear peripheral configuration to fit over the upper end surfaces of legs 21a of the body element. The elongately medial portions of each side of the top element define similar holes 26 positioned to be axially coincident with holes 24 defined in legs 21a to receive threaded fasteners 27, in the instance illustrated comprising headed thumb screws, fastenably extending between the top and legs. The lower laterally medial surface of top element 25 may define one or more channels 28 to fit about and better fasten gas supply pipes 18 carried in the recess 22 enclosed by the top element.

Support arm cylinder 29 is a circular disk configured to fit in rotatable adjacency within cylinder channel 23, with an axial length equal to that of the cylindrical channel. The support arm cylinder 29 defines diametrically extending threaded hole 30 to threadedly receive a support arm 12.

The support arm 12 provides elongate threaded body 31 configured to threadedly engage within hole 30 of the support arm cylinder 29. The outer or lower portion of the body 31 provides structurally joined square boss 32 structurally carrying head 33, in the instance illustrated comprising a sector of a sphere, to provide a support arm with the general configuration of a common carriage bolt. Threaded body 31 carries threadedly engaged fastener 34, in the instance illustrated comprising a wing nut, to positionally maintain the threaded body 31 in the support arm 29 and positionally maintain the angulation of the support arm relative to the body element 21 when fastened against the body.

For the support guide to provide utility, it must releasably fit for positional maintenance upon the gas supply pipes 18 of a torch which it services. This fit may be accomplished directly by providing configurations of recess 22 and lower surface of top element 25 that releasably fit upon a particular supply pipe configuration for appropriate positional maintenance as shown in FIGS. 5–6. This, however, requires various different configurations of the surfaces defining the recess 22 even to fit upon the three common types of gas supply pipe configurations, and may also require further particular configuration to fit upon other specific designs of gas pipe arrays used by different manufacturers.

With use of filler blocks, as shown in FIGS. 7A–7C, a generically configured enclosed recess 22a may be designed for use with gas supply pipe configurations of the three common generic types and for additional particular configurations required by individual manufacturers. This recess 22a is formed with vertical and horizontal dimensions each at least as great as the largest corresponding dimensions of a particular pipe configuration, and larger if desired. Filler blocks then are designed to fit within this enclosed recess and about the gas supply pipes with sufficient engagement to fasten and positionally maintain the supporting guide on the pipes.

For two vertically related supply pipes, as shown in FIG. 7A, two filler blocks 35 that are mirror images of each other about a vertical plane therebetween are formed to fit on the sides and about a portion of the pipes. The filler blocks 36 for the three pipe array of FIG. 7B are similar except the two lateral blocks 36a are configured with planar facing surfaces to fit adjacent the two sides of the three vertically related gas supply pipes, with inner surfaces in immediate adjacency to the outer surfaces of the pipes. Upper and lower filler blocks 36b extend between the vertically outer surfaces of the pipes to provide vertical positional maintenance of the pipes in recess 22a for positional maintenance. The filler blocks 37 of FIG. 7C for three triangularly arrayed gas supply pipes are positioned above the upper supply pipe or pipes and below the lower supply pipe or pipes without any adjacent surface contact between the fillers.

The pipe facing surfaces of each filler may be particularly configured to fit about a portion of the adjacent pipe surfaces for appropriate friction that responsively begets positional maintenance of the supporting guide on the supply pipes. All of these fillers are positionally maintained within the enclosed recess 22 when the top element 25 is in position to enclose that recess, or they may be attached to the adjacent body surface by known joinder methods appropriate to the materials and their environment, if desired.

Having described the structure of my support guide, its use and operation may be understood.

A guide with parts formed according to the foregoing specification is assembled by inserting support arm cylinder 29 in cylinder channel 23 of body element 21 and moving it into the channel until hole 30 of the cylinder is aligned with arcuate slot 24 defined through the bottom curved portion 21b of the body. Fastener 34 then is threadedly engaged in the medial portion of threaded body 31 of the support arm 12 and the threaded body engaged in hole 30 defined in the support arm cylinder. The extension of body 31 into cylinder 29 is adjusted so that the support arm will have the proper extension from the body when the body is carried on a welding torch to be serviced, and the angular relation of the threaded body 31 is adjusted relative to body element 21 for the particular use desired. In this state, the fastener 34 is rotated to move adjacent to the lower surface of curved body portion 21b to fasten and positionally maintain the support arm in its adjusted position.

Top element 25 then is removed by loosening thumb screws 27 and removing at least one thumb screw so that gas supply pipes 18 of a torch to be serviced may be inserted within recess 22 defined by the body element 21. If used, fillers appropriate for the particular gas supply pipe configuration are inserted. The gas pipes of a torch to be serviced are then positioned within recess 22. Top element 25 then is replaced in its normal position on body legs 21a and fastened by thumb screws 37 to positionally maintain the supporting guide on the gas supply pipes 18 for use.

The use of the supporting guide to make a perpendicular linear cut in metal sheet material as guided by a template is shown in FIG. 1. The template 38 in this instance is a piece of angle iron immovably maintained relative to the material 39 to be cut. Before making the cut, the supporting guide is attached to torch 10 and both the projection and angulation of support arm 12 are adjusted by loosening fastener 34, manually moving the threaded body 31 to the proper position and then retightening the fastener against body 21 to maintain that position. The ignited torch then is placed with head 33 of the support arm 12 immediately adjacent a guiding surface of template 38 and moved along the template with constant positional relationship to the template to form cut 40 parallel to the template shape, in the instance illustrated a linear cut.

The use of the supporting guide in making a free hand angulated cut is shown in FIG. 2. Here again the support arm 12 is manually adjusted to extend in angulated relationship to a plane through the axes of the welding pipes 18 of torch 10 by loosening fastener 34, manually manipulating the support arm 12 to the proper position and retightening the fastener. In this mode, the torch may make free hand cuts as guided by a user, but yet the torch will be supported at a constant distance from to the material 39 being cut and at an easily visually determinable angle to that material to aid torch manipulation to provide a smooth and regular cutting operation.

The use of the supporting guide to make a horizontal cut 40 in a vertical workpiece 39 is shown in FIG. 3. The template 38, again an angle iron, is immovably affixed to the material 39 spacedly adjacent the position whereat the cut to be made. The template may be either above or below the proposed cut, but generally it is more practically operative if it is above the cut, as illustrated. The support arm 12 of the guide is manually adjusted as for the other cuts and supported on the template as shown, to be manually moved along the template to maintain the torch in appropriate position relative to the material 39 for proper cutting while following a course having the same configuration as the template and at a spaced distance therefrom.

Though for simplicity of illustration my supporting guide is shown in use with linear pieces of angle iron, it is to be understood that it can be used with most types of templates that provide a surface or edge of the appropriate configuration and is positionally maintained relative to a workpiece to be operated upon. It is further to be understood that though the supporting guide is illustrated in cutting operations, it is equally applicable to welding, brazing or soldering, and though not so commonly used for those purposes they are within its ambit and scope.

The foregoing description of my invention is necessarily of a detailed nature so that a specific embodiment of its best mode might be set forth as required, but it is to be understood that various modifications of detail, rearrangement and multiplication of parts might be resorted to without departing from its spirit, essence or scope.

Having thusly described my invention, what I desire to protect by letters patent, and

What I claim is:

1. A supporting guide for an oxyacetylene torch, having at least one gas supply pipe extending a spaced distance between a valving structure and a burner tip elbow carrying burner tip extending in angulated orientation to the gas supply pipe, comprising in combination:
    a U-shaped body having spaced legs defining a recess to fit about the at least one gas supply pipe, said body extending spacedly distant from the recess to define a cylindrical channel extending through the body, with an arcuate slot communicating from the cylindrical channel through the body distally from the recess;
    a top element releasably carried by the body legs to extend therebetween to enclose the recess to position the at least one gas supply pipe in the recess;
    a support arm cylinder pivotally carried in the cylindrical channel and defining a diametrically extending threaded hole; and
    a support arm having an elongate threaded body threadedly engaged in the hole defined in the support arm cylinder and extending through the arcuate slot defined in the body and spacedly distant therefrom, said threaded body having a head in its end distal from the body and carrying thereon a threadedly engaged fastener having means to aid manual turning to releasably fasten the support arm at a position relative to the body.

2. The supporting guide of claim 1 having the recess defined in the body configured to fit immediately adjacent portions of the at least one gas supply pipe to positionally maintain the supporting guide on the at least one gas supply pipe when the recess is enclosed by the top element.

3. The supporting guide of claim 1 further having at least one filler carried within the recess defined in the body and adjacent to the at least one gas supply pipe extending therethrough to positionally maintain the at least one gas supply pipe relative to the body when the recess is enclosed by the top element.

4. A supporting guide for an oxyacetylene torch having at least two spacedly related gas supply pipes extending from a rearward valving structure spacedly forward to a burner tip elbow carrying a burner tip extending perpendicularly to the gas supply pipes, comprising in combination:
    a body having similar spaced legs defining a gas supply pipe recess therebetween and interconnected by a lower body portion having a lowermost circularly cylindrical surface, said lower body portion defining a circularly cylindrical support arm cylinder channel extending therethrough parallel to the axis of the lowermost circularly cylindrical surface of the body, with an arcuate slot defined through the lower body portion communicating from the cylindrical channel through the lowermost circularly cylindrical surface of the body with an arc length of at least 90 degrees;
    a top extending between the legs of the body releasably attached to the legs to enclose the body recess,
    a support arm cylinder carried in the support arm cylinder channel for pivotal motion in the channel, said support arm cylinder defining a diametrically extending threaded hole aligned with the arcuate slot defined in the lower portion of the body; and
    a support arm having an elongate threaded body engaged in the hole defined in the support arm cylinder and extending through the arcuate slot defined in the lower portion of the body to extend spacedly therefrom, said threaded body
        having a head at an end distal from the body to movably support the supporting guide on a supporting surface and
        carrying a threadedly engaged fastener, having means for manual manipulation, between the supporting guide body and the head to releasably fasten the threaded support arm body relative to the body.

* * * * *